US011510283B2

(12) United States Patent
 Sadeghi et al.

(10) Patent No.: US 11,510,283 B2
(45) Date of Patent: Nov. 22, 2022

(54) WLAN SENSING USING HIGH-EFFICIENCY (HE) TRIGGER- BASED (TB) PPDUS (HE TB PPDUS)

(71) Applicant: Intel Corporation, Santa Clara, CA (US)

(72) Inventors: Bahareh Sadeghi, Portland, OR (US); Carlos Cordeiro, Portland, OR (US); Claudio Da Silva, Portland, OR (US); Cheng Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 15/930,526

(22) Filed: May 13, 2020

(65) Prior Publication Data

US 2020/0305231 A1 Sep. 24, 2020

Related U.S. Application Data

(60) Provisional application No. 62/847,478, filed on May 14, 2019.

(51) Int. Cl.
| | |
|---|---|
| *H04W 88/10* | (2009.01) |
| *H04B 7/06* | (2006.01) |
| *H04B 7/0452* | (2017.01) |
| *H04W 12/30* | (2021.01) |

(Continued)

(52) U.S. Cl.
CPC .......... *H04W 88/10* (2013.01); *H04B 7/0452* (2013.01); *H04B 7/0626* (2013.01);
(Continued)

(58) Field of Classification Search
CPC ... H04W 88/08; H04W 88/085; H04W 88/10; H04W 84/02; H04W 84/10; H04W 84/12;
(Continued)

(56) References Cited

U.S. PATENT DOCUMENTS 3,849,080 A * 11/1974 Zechmeister .......... B22D 13/00
 428/592
2011/0205968 A1* 8/2011 Kim .................... H04W 72/085
 370/328

(Continued)

*Primary Examiner* — Warner Wong
(74) *Attorney, Agent, or Firm* — Schwegman Lundberg & Woessner, P.A.

(57) ABSTRACT

An access point (AP) configured for wireless local area network (WLAN) sensing is configured to encode a trigger frame (TF) for transmission. The trigger frame allocates resource units (RUs) for receiving high-efficiency (HE) trigger-based (TB) physical-layer protocol data units (PPDUs) (HE TB PPDUs) from a plurality of client devices (non-AP STAs). The trigger frame may solicit each of the client devices to transmit an HE TB PPDU in accordance with an UL OFDMA technique or an UL MU-MIMO technique. The AP may decode the HE TB PPDUs received from the client devices and may estimate channel state information (CSI) for a radio link associated with each of the client devices based on an HE-LTF of an associated one of the HE-TB PPDUs received from one of the client devices. In accordance with these embodiments, the AP may process changes in the CSI of the radio links over time for a WLAN sensing application.

20 Claims, 4 Drawing Sheets

(51) Int. Cl.
*H04W 12/63* (2021.01)
*H04W 84/12* (2009.01)
*H04W 24/08* (2009.01)
*H04L 43/08* (2022.01)

(52) U.S. Cl.
CPC .......... *H04W 12/30* (2021.01); *H04W 12/63* (2021.01); *H04L 43/08* (2013.01); *H04W 24/08* (2013.01); *H04W 84/12* (2013.01)

(58) Field of Classification Search
CPC .............. H04W 12/00; H04W 12/002; H04W 72/1226; H04W 28/0827; H04W 24/00; H04W 24/08; H04B 7/19; H04B 7/21; H04B 7/0626; H04B 7/0408; H04B 7/0413; H04B 7/0452; H04B 7/024; H04L 1/0001; H04L 1/0693
See application file for complete search history.

(56) References Cited

U.S. PATENT DOCUMENTS

| | | | |
|---|---|---|---|
| 2013/0094488 A1* | 4/2013 | Choi | H04W 16/28 370/338 |
| 2016/0142122 A1* | 5/2016 | Merlin | H04B 7/0626 375/267 |
| 2016/0261327 A1* | 9/2016 | Merlin | H04L 1/0026 |
| 2016/0262050 A1* | 9/2016 | Merlin | H04L 1/0027 |
| 2016/0262051 A1* | 9/2016 | Merlin | H04W 28/06 |
| 2016/0330732 A1* | 11/2016 | Moon | H04B 7/0639 |
| 2019/0090259 A1* | 3/2019 | Oteri | H04W 28/0242 |
| 2019/0116513 A1* | 4/2019 | Verma | H04L 27/2666 |
| 2019/0215037 A1* | 7/2019 | Seok | H04L 5/00 |
| 2020/0029324 A1* | 1/2020 | Nezou | H04W 74/0833 |
| 2020/0037182 A1* | 1/2020 | Connolly | H04L 43/50 |
| 2020/0177340 A1* | 6/2020 | Gupta | H04L 5/0007 |

* cited by examiner

WLAN SENSING USING HIGH-EFFICIENCY (HE) TRIGGER- BASED (TB) PPDUS (HE TB PPDUS)

PRIORITY CLAIM

This application claims the benefit of priority under 35 U.S.C. 119(e) to U.S. Provisional Patent Application Ser. No. 62/847,478, filed May 14, 2019 [reference number AC2245-Z] which is incorporated herein by reference in its entirety.

TECHNICAL FIELD

Embodiments pertain to wireless local area networks (WLANs). Some embodiments pertain to WLAN sensing. Some embodiments pertain to the IEEE 802.11 WLAN Sensing Study Group. Some embodiments pertain to the IEEE 802.11bf WLAN Sensing Task Group. Some embodiments related to WLAN sensing using high-efficiency (HE) trigger-based (TB) physical-layer protocol data units (PP-DUs) (HE TB PPDUs)

BACKGROUND

There are accuracy and reliability issues associated with Wi-Fi and WLAN sensing. There are general needs for improved WLAN sensing that increase sensing reliability and allow for various WLAN sensing implementations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

WLAN sensing relies on observing the Channel State Information (CSI) obtained with multiple WLAN packets over time and detecting changes that indicate an event of interest, such as motion in a room or a person approaching a device. To increase sensing reliability and to enable certain applications, WLAN sensing implementations may need to track CSI time changes of links to different devices; that is, measurements must be performed with PPDUs sent by different devices at approximately the same time. The embodiments disclosed herein provide for a low-overhead WLAN sensing implementation that satisfies the timing requirement by making use of UL OFDMA and/or UL MU-MIMO transmissions of HE PPDUs.

In accordance with some embodiments, an access point (AP) configured for wireless local area network (WLAN) sensing is configured to encode a trigger frame (TF) for transmission. The trigger frame allocates resource units (RUs) for receiving high-efficiency (HE) trigger-based (TB) physical-layer protocol data units (PPDUs) (HE TB PPDUs) from a plurality of client devices (non-AP STAs). The trigger frame may solicit each of the client devices to transmit an HE TB PPDU in accordance with an UL OFDMA technique or an UL MU-MIMO technique. The AP may decode the HE TB PPDUs received from the client devices, and may estimate channel state information (CSI) for a radio link associated with each of the client devices based on an HE-long-training field (LTF) (HE-LTF) of an associated one of the HE-TB PPDUs received from one of the client devices. In accordance with these embodiments, the AP may process changes in the CSI of the radio links over time for a WLAN sensing application. These embodiments are described in more detail below.

In some embodiments, a physical layer protocol data unit may be a physical layer conformance procedure (PLCP) protocol data unit (PPDU). In some embodiments, the AP and client devices may communicate in accordance with one of the IEEE 802.11 standards. IEEE draft specification IEEE P802.11ax/D4.0, February 2019 is incorporated herein by reference in its entirety.

Figure 1:
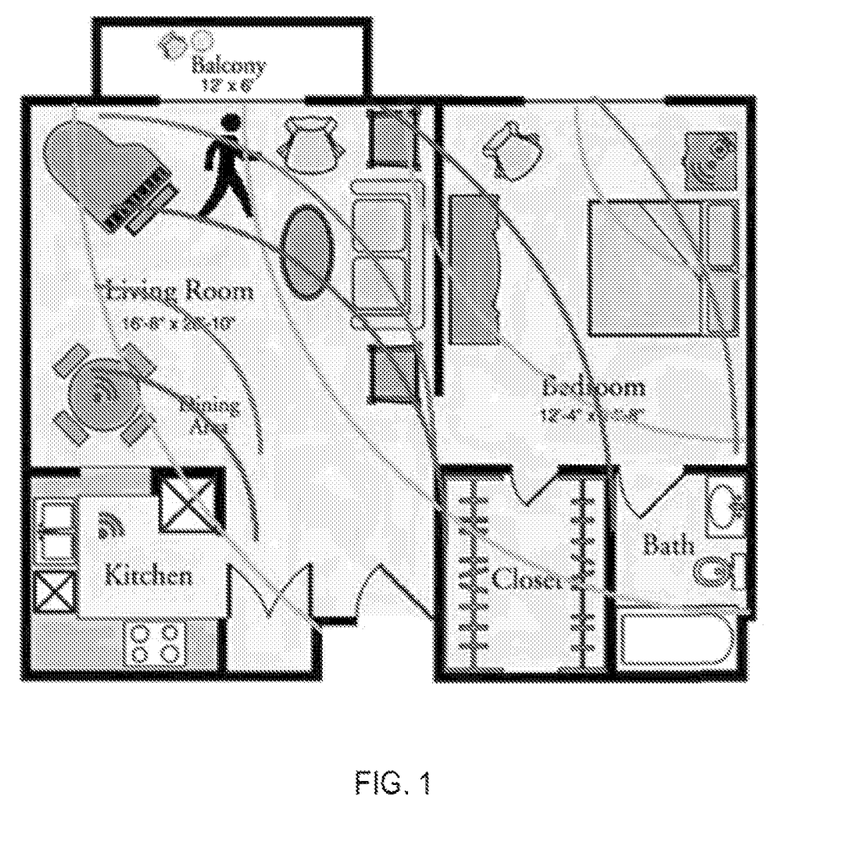
FIG. 1 is an illustration of a home monitoring system that uses WLAN sensing in accordance with some embodiments.

FIG. 1 is an illustration of a home monitoring system that uses WLAN sensing in accordance with some embodiments. In summary, the architecture of many, if not most, WLAN sensing applications being considered consists of an AP that measures the CSI of multiple radio links (that is, multiple clients) over time, and a decision is made either locally (intelligence in the AP) or in the cloud. In one or more embodiments, the procedure used by a WLAN sensing implementation to obtain the required CSI of multiple links/devices over time may be one of the following:

Approach 1: AP broadcasts a packet to all clients, clients estimate the CSI (at approximately the same time, using the same packet), and feedback the estimate to the AP. The feedback can be the complete CSI information, a compressed CSI estimate, or even a standard-defined metric (CSI "variance," for example), among other possible solutions. Process is repeated with a given periodicity. The overhead intrinsic to this approach (resultant from the fact that clients must prepare and transmit feedback) is an issue.

Approach 2: AP orchestrates a protocol in which each client sends a packet to the AP at approximately the same time with a given periodicity. CSI measurements are taken directly by the AP and no feedback is required.

A drawback of this approach is that sensing applications require CSI measurements of multiple links/devices to be taken at approximately the same time (that is, several snapshots are taken from a given environment from different angles—at about the same time). The reliability of the sensing application may significantly decrease if the time gap between measurements from multiple devices is non negligible (pictures taken from different angles at different times are likely blurry due to movement). This requirement may result in packet collisions and also creates scheduling challenges. It is worth noting that Approach 1 could be implemented with DL OFDMA or DL MU-MIMO. As described later in this disclosure, the channel/CSI estimation process will be different in these cases.

In one or more embodiments, an implementation may be proposed that addresses both the feedback/overheard and timing requirement issues that exist in the two approaches previously described. In this implementation, the measurements are obtained directly by the AP, in similar fashion to Approach 2, and thus does not require feedback and avoids the possibly heavy overhead intrinsic to an implementation similar to the one described in Approach 1. But different from Approach 2, the AP takes measurements of the radio link to all devices simultaneously by using HE PPDUs (UL OFDMA or UL MU-MIMO).

Specifically, in the proposed implementation, after triggered by the AP performing sensing (that is, AP sends a Trigger frame to allocate RU and solicit uplink HE TB PPDU transmissions from the devices), devices simultaneously transmit "sensing" packets—in the form of HE TB PPDUs—to the AP by using UL OFDMA transmission (which, within a given RU, could be single user or multi-user, SISO or MIMO) or a (full bandwidth) UL MU-MIMO transmission. The AP can thus estimate the (complete or partial) channel/CSI to each of the devices using the HE-LTF field of the HE TB PPDU transmitted by the corresponding device.

In UL OFDMA embodiments, devices transmit at the same time on different subchannels within the same channel (RUs). UL MU transmission allows an AP to simultaneously receive information from more than one non-AP STA. In WLAN sensing applications, this characteristic may be used not to simultaneously receive information from more than one client but instead to estimate the channel (CSI) to more than one client simultaneously.

UL MU transmissions are preceded by a Trigger frame or a frame carrying a TRS Control subfield from the AP. The non-AP STAs transmit using the HE TB PPDU format and employ either UL OFDMA, UL MU-MIMO, or a mixture of both. For WLAN sensing applications, the trigger frame, or a different frame transmitted within the same PPDU, may include sensing-specific information.

In OFDMA transmissions, different users can occupy different RUs in a PPDU. The transmission within an RU in a PPDU may be a single stream to one user, spatially multiplexed to one user (SU-MIMO), or spatially multiplexed to multiple users (MU-MIMO). WLAN sensing applications may use any of these three transmission modes for a given RU. As discussed further below in this document, these three different modes bring different implications for channel estimation.

UL MU-MIMO is a technique to allow multiple STAs to transmit simultaneously over the same frequency resource to the receiver. The concept is very similar to SU-MIMO where multiple space-time streams are transmitted simultaneously over the same frequency resource utilizing spatial multiplexing through multiple antennas at the transmitter and receiver. The key difference from SU-MIMO is that in UL MU-MIMO, the transmitted streams originate from multiple STAs.

As previously described, the proposal consists in implementing WLAN sensing applications by simultaneously tracking multiple links using UL OFDMA transmissions or UL MU-MIMO transmission. It is important to note that the CSI obtained with each of these three transmission modes is different. Specifically, for an OFDMA transmission, the values of HE-LTF sequence are set to zero if they are assigned to subcarriers within RUs that are not allocated to any user. Therefore, in this case, the WLAN sensing application would make decisions by tracking changes over time in a band that is smaller than the channel bandwidth for each radio link/device.

For partial and full bandwidth UL MU-MIMO, the HE-LTF field could assume different configurations and also have different lengths. Specifically, the Trigger frame indicates whether the UL MU transmission following it uses HE single stream pilot HE-LTF mode or HE masked HE-LTF sequence mode or no pilots if a 1×HE-LTF is used. If HE single stream pilot HE-LTF mode is used, no masking is applied to the HE-LTF. HE single stream pilot HE-LTF mode is used for any UL OFDMA transmission, including UL OFDMA with MU-MIMO transmissions. The appropriate MU-MIMO LTF mode indicated by the Trigger frame is used for full bandwidth UL MU-MIMO transmission except for 1×HE-LTF." Therefore, depending on the sensing application (desired accuracy and false alarm rate, for instance) and variables such as number of devices and channel conditions, the AP triggering the measurements would have to determine the most appropriate transmission mode for the devices.

The goal of this section is to further justify the need for sensing implementations to track multiple radio links. Results that are presented are obtained in support of CCG's proximity detection application.

Figure 2A:
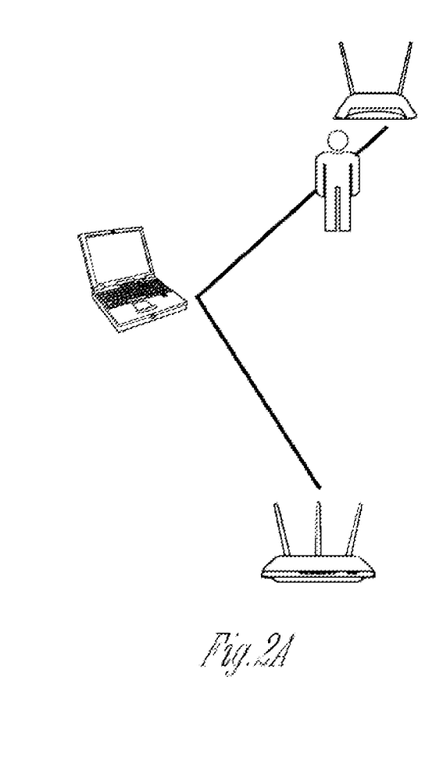
FIGS. 2A, 2B and 2C illustrate motion detection in a home monitoring system built on WLAN sensing in accordance with some embodiments.
Figure 2B:
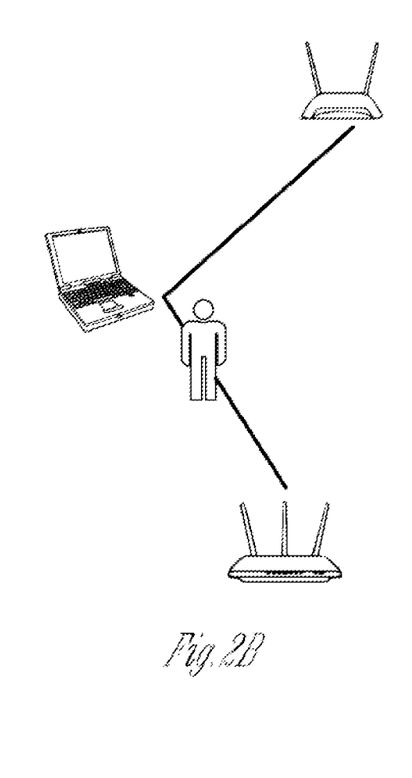
Figure 2C:
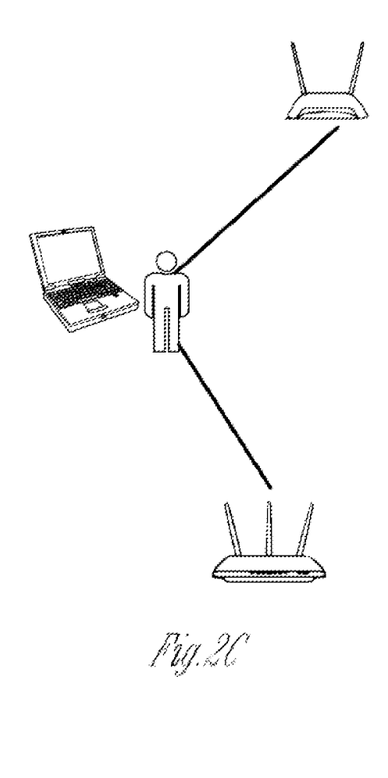

The goal of WLAN sensing in this particular application is to determine when a user approaches a device (~1-1.5 meter). It may not be possible to address this application by monitoring a single radio link. This is because if the person is moving relatively "close" to a given link, the AP will detect changes to the link, but it is not able to determine whether the person is close to the transmitter, close to the receiver, or somewhere between the two devices. However, if multiple links are being tracked, the system may detect changes to just one (or a few) of the links it tracks or to all (or most) of them. For example, in the scenario illustrated in FIG. 2A, motion will likely be detected in the upper link only (because the user is close to just one of the two APs). Similarly, in FIG. 2B, "strong" motion will likely be detected in one of the links (lower link) and "weak" motion is detected in the other (upper) link. This is an indication that movement is far from the notebook. However, if movement is very close to the notebook, as illustrated in FIG. 2C, both links will show "strong" motion and the notebook computer would indicate that the user is approaching the device.

Figure 3:
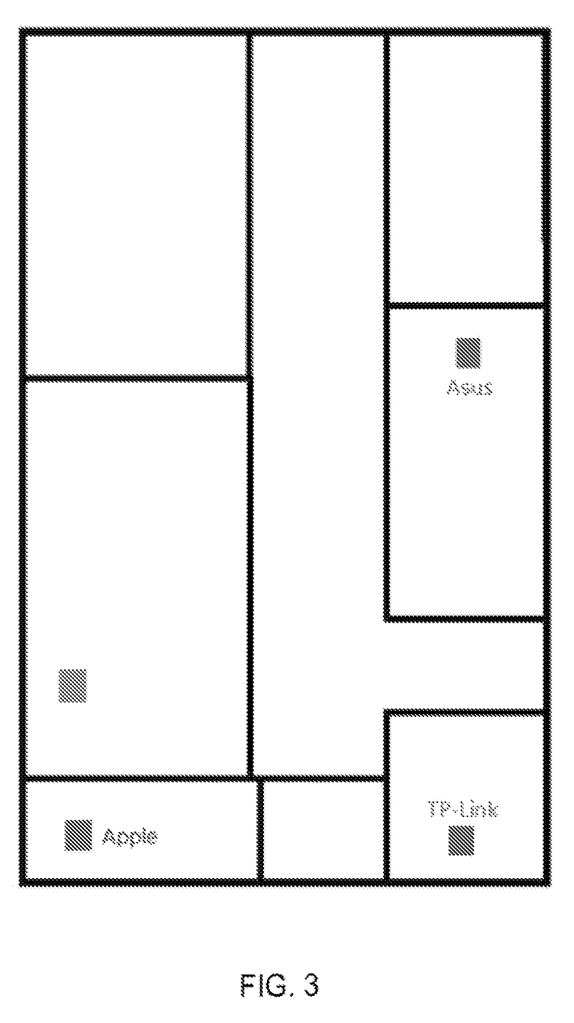
FIG. 3 illustrates the operation of a home monitoring system using WLAN sensing in accordance with some embodiments.

FIG. 3 illustrates the operation of a home monitoring system using WLAN sensing in accordance with some embodiments. To evaluate the embodiments previously described, a large number of measurements was performed in a home environment with the equipment. A Dell notebook used has an Intel 9260 chipset, and the APs were: Apple AirPort A1354 (Marvell 88W8366 chipset), TP-Link Archer C7 (QCA9563), and Asus AC3100 (BCM4366). The APs were set in different rooms of the house as shown in FIG. 3, and the Dell notebook (represented by a green square) was put in a fourth room by itself. The measurements consisted in having one person moving in one of the rooms at a given measurement run. In each room, for calibration purposes, the person was static for the first 30 seconds of the measurement.

In accordance with some embodiments, the magnitude of the change in CSI for each device can be used to quantify how much the amplitude of the CSI estimated with approximately 20 packets changed in the time interval when they were received. Larger metric values indicate more changes to the CSI. In this example, among the 6 links tracked by the notebook (3 different APs, 2 RX antennas), only two of them indicated movement after the 30 s mark—and, as expected, the links that indicated change were the ones associated with the TP-Link AP. When the person moving around was in the same room as the Asus AP, due to the geometry of the APs and of the house construction, "strong" indication of movement in the same room as the Asus AP appeared, and "medium" indication of movement in the room where the TP-Link AP was set appeared. More importantly, the links corresponding to the Apple AP didn't indicate movement and, therefore, it could be deduced that the movement was not close to the notebook. Recall that the goal in this experiments is to detect movement close to the notebook.

Measurements obtained when a person moved close (within 0.5 m) to the Dell notebook resulted in all six links indicating motion. If movement happened in the same room as the Dell notebook but further away (3 m in this example), change was also detected (all six links simultaneously indicated change), but the "amount" of change (metric value) was lower. Thus, by conveniently tracking multiple links and thresholding the value of the metric used, proximity detection could be performed in the scenario here considered. Currently the proposed system is being evaluated and refined to achieve a higher degree of reliability.

Figure 4:
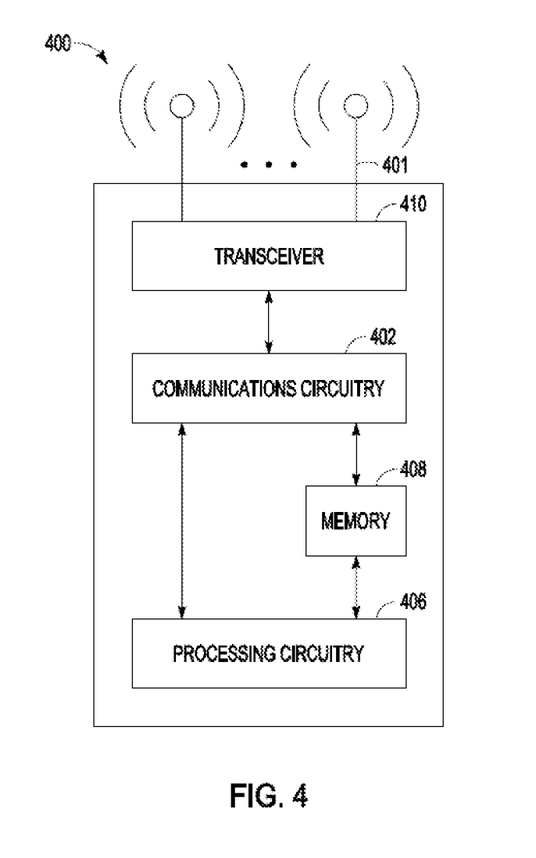
FIG. 4 shows a functional diagram of an exemplary communication station in accordance with one or more example embodiments of the present disclosure.

FIG. 4 shows a functional diagram of an exemplary communication station 400, in accordance with one or more example embodiments of the present disclosure. In one embodiment, FIG. 4 illustrates a functional block diagram of a communication station that may be suitable for use as an AP 102 or a client/user device 120 (i.e., non-AP STA) in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations described herein.

In accordance with embodiments disclosed herein, an access point (AP) comprising processing circuitry and memory may be configured for wireless local area network (WLAN) sensing. In these embodiments, the processing circuitry may encode a trigger frame (TF) for transmission, the trigger frame to allocate resource units (RUs) for receiving high-efficiency (HE) trigger-based (TB) physical-layer protocol data units (PPDUs) (HE TB PPDUs) from a plurality of client devices (non-AP STAs). The trigger frame may solicit each of the client devices to transmit an HE TB PPDU in accordance with an UL OFDMA technique or an UL MU-MIMO technique. The processing circuitry may decode the HE TB PPDUs received from the client devices and may estimate channel state information (CSI) for a radio link associated with each of the client devices based on an HE-LTF of an associated one of the HE-TB PPDUs received from one of the client devices. The processing circuitry may also process changes in the CSI of the radio links over time for a WLAN sensing application. The memory may be configured to store the TF.

In some proximity detection embodiments, the WLAN sensing application comprises a proximity detection application. For the proximity detection application, the processing circuitry may detect motion in proximity to one or more of the client devices based on changes in the CSI of the radio links over time, and repeat the encoding, decoding, estimating on a regular basis over the period of time to track the changes in the CSI of each of the radio links over time to detect motion in proximity to one or more of the client devices. If motion is detected, the processing circuitry may encode signalling indicative of the detected motion for transmission.

In some motion detection embodiments, the WLAN sensing application comprises a motion detection application. For the motion detection application, the processing circuitry may detect motion with respect to one or more of the client devices based on changes in the CSI of the radio links over time, and repeat the encoding, decoding, estimating on a regular basis over the period of time to track the changes in the CSI of each of the radio links over time to detect motion in with respect to one or more of the client devices.

In some home security embodiments, the WLAN sensing application comprises a home security application. The HE TB PPDUs may be received from client devices that are located in different rooms of a building (i.e., home, house, office building). In these embodiments, the processing circuitry may detect motion with respect to one or more of the client devices based on changes in the CSI of the radio links over time, determine which of the different rooms the motion is detected, and encode signalling indicative of the detected motion for transmission. In these home-security embodiments, motion detection in a particular room may trigger a notification on a user's device which may be running a security monitoring application.

In some biometric monitoring embodiments, the WLAN sensing application comprises a biometric monitoring application. For the biometric monitoring application, the processing circuitry may monitor one or more biometrics of a human located proximate to the client devices based on changes in the CSI of the radio links over time and encode signalling indicative of the monitored biometric for transmission. In these biometric monitoring embodiments, the one or more biometrics that may be monitored may include vital signals (e.g., heartrate, respiration rate, etc.).

In some gesture recognition embodiments, the WLAN sensing application comprises a gesture recognition application. For the gesture recognition application, the processing circuitry may monitor changes in the CSI of the radio links over time to detect a gesture of a human located proximate to the client devices and encode signalling indicative of the detected gesture for transmission.

In some embodiments, the processing circuitry may apply a threshold value to the changes in the CSI to detect motion with respect to one or more of the client devices.

In some embodiments, for the UL OFDMA technique, the trigger frame may be encoded to allocate each client device a different subchannel within a resource unit (i.e., channel), each subchannel of the resource unit comprising a plurality of subcarrier. For the UL OFDMA technique, each client device may set values of an HE-LTF sequence to zero for unassigned subcarriers within the resource unit and may set values for assigned subcarriers with the RU in accordance with the HE-LTF sequence to allow the AP to estimate the CSI for the different client devices. In embodiments that use the UL OFDMA technique, the AP tracks changes to the CSI for an associated client device over a subchannel (i.e., the allocated or assigned subchannel) rather than the full channel bandwidth of a resource unit.

In some embodiments, for the UL MU-MIMO technique, the trigger frame may be encoded to allocate/assign each client device the same subchannels within a resource unit for transmission of an HE TB PPDU and to indicate to the client devices an LTF transmission mode to use for transmission of the HE TB PPDU. In these embodiments, the LTF transmission mode may include a HE single stream pilot HE-LTF mode, an HE masked HE LTF sequence mode, or a 1×HE-LTF mode with no pilots.

In some embodiments, for full-bandwidth UL MU-MIMO, all subchannels of the resource unit are allocated and either the HE single stream pilot HE-LTF mode or the HE masked HE LTF sequence mode is indicated. For partial-bandwidth UL MU-MIMO, less than all subchannels of the resource unit are allocated and the 1×HE-LTF mode with no pilots is indicated. In some embodiments, the processing circuitry may select the LTF transmission mode based on a desired accuracy and false-alarm rate for the detection of motion.

In embodiments that use a full-bandwidth UL MU-MIMO technique, the AP tracks changes to the CSI for an associated client device over the full channel bandwidth of a resource unit. In embodiments that use partial-bandwidth UL MU-MIMO technique, the AP tracks changes to the CSI for an associated client device over the bandwidth of a resource unit that is assigned to more than one client device.

In some of these embodiments, in response to the trigger frame, each of the client devices transmits the HE TB PPDU substantially simultaneously in accordance with either the UL OFDMA technique or the UL MU-MIMO technique. In other words, the HE TB PPDUs transmitted by the client devices overlap in time although there may be a small time and/or frequency offset between their transmissions.

In some embodiments, the client devices comprise non-AP stations (STAs) configured to operate in accordance with an IEEE 802.11 communication technique. In some embodiments, the client devices further include one or more AP stations configured to operate in accordance with an IEEE 802.11 communication technique and respond to the TF with a HE TB PPDU.

In some embodiments, the processing circuitry may employ a machine learning technique (e.g., to learn the signal characteristics associated with locations of the client devices and learn and how to recognize motion with respect to the client devices). In some embodiments, in addition to HE TB PPDUs, the processing circuitry may use data packets and management frames to supplement the CSI processing. In some embodiments, the processing circuitry includes a baseband processor and may decode the HE TB PPDUs from the client devices that are received through at least two antennas.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 400 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the apparatus comprising:
processing circuitry; and memory, the processing circuitry to configure the AP for wireless local area network (WLAN) sensing, wherein the processing circuitry is configured to:
encode a trigger frame (TF) for transmission, the trigger frame to allocate resource units (RUs) for receiving high-efficiency (HE) trigger-based (TB) physical-layer protocol data units (PPDUs) (HE TB PPDUs) from a plurality of client devices (non-AP STAs), the trigger frame to solicit each of the client devices to transmit an HE TB PPDU in accordance with an UL OFDMA technique or an UL MU-MIMO technique;
decode the HE TB PPDUs received from the client devices;
estimate channel state information (CSI) for a radio link associated with each of the client devices based on an HE-LTF (high-efficiency long-training field) of an associated one of the HE-TB PPDUs received from one of the client devices; and
process changes in the CSI of the radio links over time for a WLAN sensing application,
wherein the memory is configured to store the TF.

2. The apparatus of claim 1, wherein the WLAN sensing application comprises a proximity detection application, wherein for the proximity detection application, the processing circuitry is configured to: detect motion in proximity to one or more of the client devices based on changes in the CSI of the radio links over time, and repeat the encoding, decoding, estimating on a regular basis over the period of time to track the changes in the CSI of each of the radio links over time to detect motion in proximity to one or more of the client devices, and
wherein if motion is detected, encode signalling indicative of the detected motion for transmission.

3. The apparatus of claim 2 wherein the processing circuitry is configured to apply a threshold value to the changes in the CSI to detect motion with respect to one or more of the client devices.

4. The apparatus of claim 3, wherein for the UL OFDMA technique, the trigger frame is encoded to allocate each client device a different subchannel within a resource unit, each subchannel of the resource unit comprising a plurality of subcarriers, and
wherein for the UL OFDMA technique, each client device is configured to set values of an HE-LTF sequence to zero for unassigned subcarriers within the resource unit and is configured to set values for assigned subcarriers with the RU in accordance with the HE-LTF sequence to allow the AP to estimate the CSI for the different client devices.

5. The apparatus of claim 4, wherein for the UL MU-MIMO technique, the trigger frame is encoded to allocate/ assign each client device the same subchannels within a resource unit for transmission of an HE TB PPDU and to indicate to the client devices an LTF transmission mode to use for transmission of the HE TB PPDU, wherein the LTF transmission mode comprises one of:
an HE single stream pilot HE-LTF mode, an HE masked HE LTF sequence mode, or a 1×HE-LTF mode with no pilots.

6. The apparatus of claim 5, wherein for full-bandwidth UL MU-MIMO, all subchannels of the resource unit are allocated and either the HE single stream pilot HE-LTF mode or the HE masked HE LTF sequence mode is indicated,
wherein for partial-bandwidth UL MU-MIMO, less than all subchannels of the resource unit are allocated and the 1×HE-LTF mode with no pilots is indicated.

7. The apparatus of claim 6, wherein the processing circuitry is configured to select the LTF transmission mode based on a desired accuracy and false-alarm rate for the detection of motion.

8. The apparatus of claim 7 wherein the client devices comprise non-AP stations (STAs) configured to operate in accordance with an IEEE 802.11 communication technique.

9. The apparatus of claim 8 wherein the client devices further include one or more AP stations configured to operate in accordance with an IEEE 802.11 communication technique and respond to the TF with a HE TB PPDU.

10. The apparatus of claim 8 wherein the processing circuitry includes a baseband processor and is configured to decode the HE TB PPDUs from the client devices that are received through at least two antennas.

11. The apparatus of claim 8 wherein the WLAN sensing application comprises a motion detection application, wherein for the motion detection application, the processing circuitry is configured to: detect motion with respect to one or more of the client devices based on changes in the CSI of the radio links over time, and repeat the encoding, decoding, estimating on a regular basis over the period of time to track the changes in the CSI of each of the radio links over time to detect motion in with respect to one or more of the client devices.

12. The apparatus of claim 8 wherein the WLAN sensing application comprises a home security application, where the HE TB PPDUs received from client devices that are located in different rooms of a building, and wherein the processing circuitry is configured to:
detect motion with respect to one or more of the client devices based on changes in the CSI of the radio links over time;
determine which of the different rooms the motion is detected; and
encode signalling indicative of the detected motion for transmission.

13. The apparatus of claim 8 wherein the WLAN sensing application comprises a biometric monitoring application, wherein for the biometric monitoring application, the processing circuitry is configured to: monitor one or more biometrics of a human located proximate to the client devices based on changes in the CSI of the radio links over time; and
encode signalling indicative of the monitored biometric for transmission.

14. The apparatus of claim 8 wherein the WLAN sensing application comprises a gesture recognition application, wherein for the gesture recognition application, the processing circuitry is configured to: monitor changes in the CSI of the radio links over time to detect a gesture of a human located proximate to the client devices; and encode signalling indicative of the detected gesture for transmission.

15. A non-transitory computer-readable storage medium that stores instructions for execution by processing circuitry of an access point (AP), wherein the instructions configure the AP for wireless local area network (WLAN) sensing, wherein the instructions configure the processing circuitry to:

encode a trigger frame (TF) for transmission, the trigger frame to allocate resource units (RUs) for receiving high-efficiency (HE) trigger-based (TB) physical-layer protocol data units (PPDUs) (HE TB PPDUs) from a plurality of client devices (non-AP STAs), the trigger frame to solicit each of the client devices to transmit an HE TB PPDU in accordance with an UL OFDMA technique or an UL MU-MIMO technique;

decode the HE TB PPDUs received from the client devices;

estimate channel state information (CSI) for a radio link associated with each of the client devices based on an HE-LTF of an associated one of the HE-TB PPDUs received from one of the client devices; and process changes in the CSI of the radio links over time for a WLAN sensing application.

16. The non-transitory computer-readable storage medium of claim 15, wherein the WLAN sensing application comprises a proximity detection application, wherein for the proximity detection application, the processing circuitry is configured to: detect motion in proximity to one or more of the client devices based on changes in the CSI of the radio links over time, and repeat the encoding, decoding, estimating on a regular basis over the period of time to track the changes in the CSI of each of the radio links over time to detect motion in proximity to one or more of the client devices, and wherein if motion is detected, encode signalling indicative of the detected motion for transmission.

17. The non-transitory computer-readable storage medium of claim 16, wherein for the UL OFDMA technique, the trigger frame is encoded to allocate each client device a different subchannel within a resource unit, each subchannel of the resource unit comprising a plurality of subcarriers, and wherein for the UL OFDMA technique, each client device is configured to set values of an HE-LTF sequence to zero for unassigned subcarriers within the resource unit and is configured to set values for assigned subcarriers with the RU in accordance with the HE-LTF sequence to allow the AP to estimate the CSI for the different client devices.

18. The non-transitory computer-readable storage medium of claim 17, wherein for the UL MU-MIMO technique, the trigger frame is encoded to allocate/assign each client device the same subchannels within a resource unit for transmission of an HE TB PPDU and to indicate to the client devices an LTF transmission mode to use for transmission of the HE TB PPDU, wherein the LTF transmission mode comprises one of:

an HE single stream pilot HE-LTF mode, an HE masked HE LTF sequence mode, or a 1×HE-LTF mode with no pilots, wherein for full-bandwidth UL MU-MIMO, all subchannels of the resource unit are allocated and either the HE single stream pilot HE-LTF mode or the HE masked HE LTF sequence mode is indicated, wherein for partial-bandwidth UL MU-MIMO, less than all subchannels of the resource unit are allocated and the 1×HE-LTF mode with no pilots is indicated.

19. A non-transitory computer-readable storage medium that stores instructions for execution by processing circuitry of a non-AP station (STA), wherein the instructions configure the non-AP STA for wireless local area network (WLAN) sensing, wherein the instructions configure the processing circuitry to:

decode a trigger frame (TF) received from an access point (AP), the trigger frame to allocate resource units (RUs) for receiving high-efficiency (HE) trigger-based (TB) physical-layer protocol data units (PPDUs) (HE TB PPDUs) from a plurality of client devices, the trigger frame to solicit each of the client devices to transmit an HE TB PPDU in accordance with an UL OFDMA technique or an UL MU-MIMO technique;

decode, in response to the TF and in accordance with the resource units allocated in the TF, a plurality of HE TB PPDUs received from a plurality of client devices in accordance with an UL OFDMA technique or an UL MU-MIMO technique; and estimate channel state information (CSI) for a radio link associated with each of the client devices based on an HE-LTF of an associated one of the HE-TB PPDUs received from one of the client devices; and process changes in the CSI of the radio links over time for a WLAN sensing application.

20. The non-transitory computer-readable storage medium of claim 19, wherein the WLAN sensing application comprises a proximity detection application, wherein for the proximity detection application, the processing circuitry is configured to: detect motion in proximity to one or more of the client devices based on changes in the CSI of the radio links over time, and repeat the encoding, decoding, estimating on a regular basis over the period of time to track the changes in the CSI of each of the radio links over time to detect motion in proximity to one or more of the client devices, and wherein if motion is detected, encode signalling indicative of the detected motion for transmission.

* * * * *